Figures 1, 2:
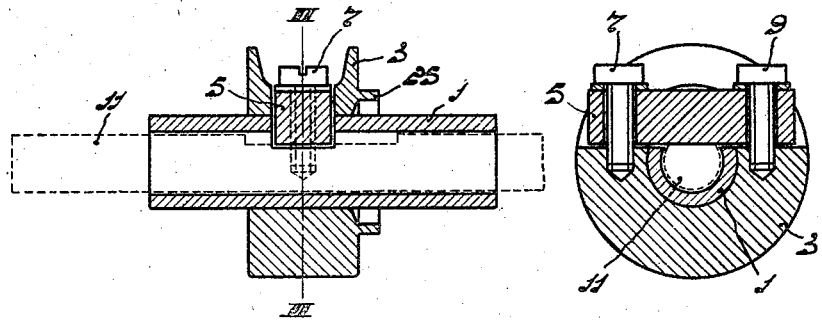

July 13, 1948. C. DEETMAN 2,444,922
MEANS FOR CONNECTING A DRIVEN MEMBER TO A SHAFT
Filed May 2, 1946

INVENTOR
CORNELIS DEETMAN
BY E. F. Wendworth
ATTORNEY

Patented July 13, 1948

2,444,922

UNITED STATES PATENT OFFICE 2,444,922

MEANS FOR CONNECTING A DRIVEN MEMBER TO A SHAFT

Cornelis Deetman, Eindhoven, Netherlands, assignor to Hartford National Bank and Trust Company, Hartford, Conn., as trustee Application May 2, 1946, Serial No. 666,669
In Belgium March 5, 1945

Section 1, Public Law 690, August 8, 1946
Patent expires March 5, 1965

2 Claims. (Cl. 287—52.05)

This invention relates to regulable apparatus, for instance a rotatable electric resistance comprising a shaft which is rotatable by means of a control knob, which shaft is fitted so as to be movable in and out of a hollow shaft (telescope shaft), and to a hollow shaft to be used for this purpose. Such a shaft construction may be used with advantage in apparatus designed to be fixed to a wall, the shaft of the apparatus extending through an aperture of the wall. In this case the length of the part of the said driving shaft projecting beyond the apparatus should be accommodated to the thickness of the said wall and to the axial length of the control knob to be used. This may, for instance, take place by cutting off the shaft to the desired length. This, however, only permits shortening of the shaft. In more expensive apparatus a telescope shaft is often used for this purpose, which permits the shaft both to be shortened and lengthened without damaging and in a simple manner, for instance by means of a screwdriver.

In practice the following difficulty is experienced. It is found to be comparatively easy to secure a control knob very rigidly to a shaft (in the present case the movable shaft) but it is difficult to provide sufficiently sturdy fastening members in the comparatively thin wall of the hollow shaft to withstand the comparatively strong torsion couples which may occur in the case of the control knob being turned until the stop seated on the hollow shaft is reached.

The present invention provides a construction in which this difficulty is avoided. According to the invention the parts to be driven by the rotary movement upon which may act considerable forces, are directly secured to a supporting member, which is carried by the hollow shaft but is directly coupled in a rigid manner with the shaft driven by the control knob. The supporting member can easily be made sufficiently heavy to permit a sturdy and rigid coupling with the movable shaft. Furthermore the said hollow shaft only carries parts upon which no strong forces act (contact arms or the like) and need not be secured in an extremely rigid manner to the movable shaft.

The supporting member may be rigidly secured to the hollow shaft in a simple manner, for instance by shrinking or pressing so as to withstand the comparatively small torsional moment required for the hollow shaft being transmitted from the movable driven shaft to the hollow shaft through the supporting member. In this case any further coupling means between these two said shafts are superfluous.

The shaft to be driven by the control knob preferably has a flat part over a certain length, upon which acts a clamping device which establishes the coupling between the said supporting member and the shaft driven. The clamping device may consist of a rod or beam which extends at right angles to the direction of the shaft and engages the flat part of the driven shaft, for instance through an aperture in the wall of the hollow shaft, the driven shaft being clamped, by means of two screw bolts acting on both sides thereof upon the beam and the said supporting member, between the beam and the member. As appears from the following, this coupling device is extremely suitable for use in the construction according to the invention.

Figure 3:
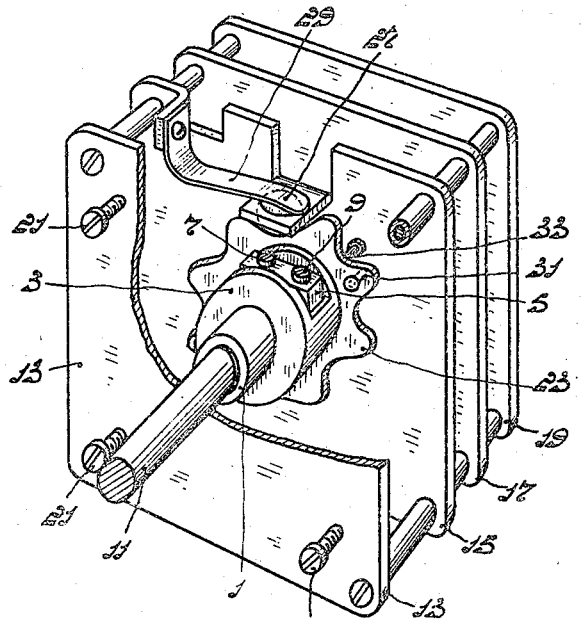

In order that the invention may be clearly understood and readily carried into effect it will now be explained more fully with reference to the accompanying drawing, given by way of example, in which Fig. 1 is an axial section and Figure 2 a cross-section on the line II—II in Figure 1 of a hollow shaft suitable for use in apparatus according to the invention. Figure 3 is a perspective view of one form of construction of apparatus according to the invention.

The hollow shaft construction shown in Figures 1 and 2 consists of a bushing 1, for instance of metal, to which is secured by pressing an annular coaxial supporting member 3. In the cylindrical surface of this ring is provided a groove which has a flat bottom and extends at right angles to the axis of the bushing 1, which groove extends in the space within the bush 1. This groove is engaged by a rod 5 substantially fitting it, which rod can be drawn towards the bottom of the groove by means of two bolts 7 and 9 provided near its ends. The supporting member 3 and the beam 5 constitute a clamping device in which can be clamped a shaft 11 (indicated by dotted lines in Figures 1 and 2) to be provided in the bush 1. As appears from the drawing the shaft 11 preferably has a flat part over a certain length which is engaged by the beam 5. As appears from the drawing the shaft 11 can be moved in and out at will over a certain length after loosening the bolts 7 and 9. After tightening the bolts this is impossible and the shaft 11 is rigidly coupled with the supporting member 3.

Figure 3 represents a rotary switch having a certain number of blocking positions and a stop, in which switch use is made of the shaft construction shown in Figures 1 and 2. The hollow shaft 1 is journalled in a frame comprising a certain number of parallel plates 13, 15, 17 and 19 of which the front plate (13) has partly been broken away for an easy view. By means of a certain number of bolts 21 screwed into this plate the switch can be fastened to a wall (not represented) of an apparatus, the movable shaft 11 extending through an aperture of the wall and carrying in a normal way a control knob which is not shown in the drawing for a better view. As regards the electrical portion the switch also may have a conventional construction.

The supporting member 3 located in the space between plates 13 and 15 has secured to it a toothed stopping disc click 23. To such end the supporting member (Fig. 1) is furnished on one side with a concentric rim 25 to which the disc 23 may be soldered or welded. The disc cooperates, in a manner known per se, with a ball 27 which in each stopping position is pushed into the space between every two teeth of the disc under the action of a spring 29. Furthermore the stop disc 23 carries a stopping pin 31 which cooperates with one or two pins 33 fixed to the plate 15.

From what has been said before it appears that the forces to be transmitted from the control knob to the stopping disc through the shaft 11 may be fairly strong, particularly upon the disc being stopped by the pins 31 and 33. These forces can be transmitted with impunity through the sturdy supporting member 3, on the one hand owing to the welded joint between the member 3 and the disc 23 and on the other hand since the supporting member is directly and rigidly secured to the shaft 11 in such a manner as to permit the transmission of comparatively strong rotational moments. In order to avoid difficulties the hollow shaft 1 does not form part of the series of elements over which this moment passes.

From Figure 3 it furthermore appears that although the said clamping device permits a robust and rigid attachment of the shaft 11 with respect to the disc 23, this attachment can be detached in a very simple manner to permit the shaft 11 to be screwed in and out. To such end it is only necessary to unscrew the bolts 7 that are easily accessible by means of a screw driver. In this way the clamping device known per se together with the beam 5 is particularly suitable for use in the aforesaid shaft construction.

What I claim is:

1. A driving device comprising a rotatable driving shaft, a hollow member loosely mounted on said shaft and having a cut-away portion, a driven member rigidly mounted on said hollow member and adapted to be driven by said shaft, clamping means for adjustably securing said driven member to the said shaft, said means including a clamping member extending through said cut-away portion and engaging said shaft and means securing said clamping means to said driven member and pressing the same against said shaft.

2. A driving device comprising a rotatable shaft having a flat portion, a hollow member loosely mounted on said rotatable member and having a transverse slot at said flat portion, a supporting member rigidly mounted on said hollow member, a clamping member in said transverse slot and having a surface in contact with the flat portion of said shaft and means securing said clamping member to said supporting member and pressing the clamping member against the flat portion of said shaft.

CORNELIS DEETMAN.

REFERENCES CITED

The following references are of record in the file of this patent:

UNITED STATES PATENTS

| Number | Name | Date |
| --- | --- | --- |
| 1,249,755 | Holmgren | Dec. 11, 1917 |